United States Patent
Chen et al.

(10) Patent No.: US 7,256,862 B2
(45) Date of Patent: Aug. 14, 2007

(54) REPAIRING METHOD FOR A LIQUID CRYSTAL DISPLAY PANEL

(75) Inventors: Chien-Ming Chen, Tao-Yuan Hsien (TW); Kei-Hsiung Yang, Tao-Yuan Hsien (TW)

(73) Assignee: HannStar Display Corp., Yangmei, Taoyuan (TW)

( * ) Notice: Subject to any disclaimer, the term of this patent is extended or adjusted under 35 U.S.C. 154(b) by 243 days.

(21) Appl. No.: 10/711,035

(22) Filed: Aug. 19, 2004

(65) Prior Publication Data
US 2005/0275792 A1 Dec. 15, 2005

(30) Foreign Application Priority Data
Jun. 10, 2004 (TW) ................. 93116726 A (51) Int. Cl.
*G02F 1/13* (2006.01)
*G02F 1/1339* (2006.01)
*G02F 1/1341* (2006.01)

(52) U.S. Cl. ............... 349/192; 349/190; 349/189; 349/154

(58) Field of Classification Search ............... 349/154
See application file for complete search history.

(56) References Cited

U.S. PATENT DOCUMENTS

| 7,086,175 B2 * | 8/2006 | Sasaki et al. ............ 34/92 |
| 2002/0033926 A1 * | 3/2002 | Nakahara et al. ........ 349/154 |
| 2004/0263767 A1 * | 12/2004 | Wang et al. ............ 349/158 |
| 2005/0057716 A1 * | 3/2005 | Hou et al. ............ 349/154 |

* cited by examiner

*Primary Examiner*—Andrew Schechter
*Assistant Examiner*—W. Patty Chen
(74) *Attorney, Agent, or Firm*—Winston Hsu (57) ABSTRACT

A repairing method of a liquid crystal display panel having a gravity defect includes steps of removing the sealant outside the liquid crystal injection hole and providing a first pressure to the liquid crystal display panel. Next, a second pressure is continuously provided to the liquid crystal display panel, and the sealant in the liquid crystal injection hole is removed. Then, a third pressure is continuously provided to the liquid crystal display panel for pressing the liquid crystal out through the injection hole, and the flowed liquid crystal is cleaned out. After that, the liquid crystal injection hole is sealed with a fresh sealant and a fourth pressure is continuously provided to the liquid crystal display panel. Finally, the fresh sealant is cured and the fourth pressure is removed.

13 Claims, 8 Drawing Sheets

REPAIRING METHOD FOR A LIQUID CRYSTAL DISPLAY PANEL

BACKGROUND OF INVENTION

1. Field of the Invention

The invention relates to a repairing method for a liquid crystal display panel, and more particularly, to a method for repairing an uneven defect on a liquid crystal display panel caused by a gravity issue.

2. Description of the Prior Art

Since the progress of science and technology has led to small, effective, and portable intelligent information products, display devices have played an important role in modern society. In recent years, display devices have undergone great improvements in the areas of high performance, quality, larger size, and lower cost. TFT-LCDs have characteristics of thinness, lightness, and low power consumption and are expected to have in the future a large market as a display device to replace CRTs. It is an important subject to develop a fabrication technique for realizing high achievement and low prices of TFT-LCDs.

Figure 1:
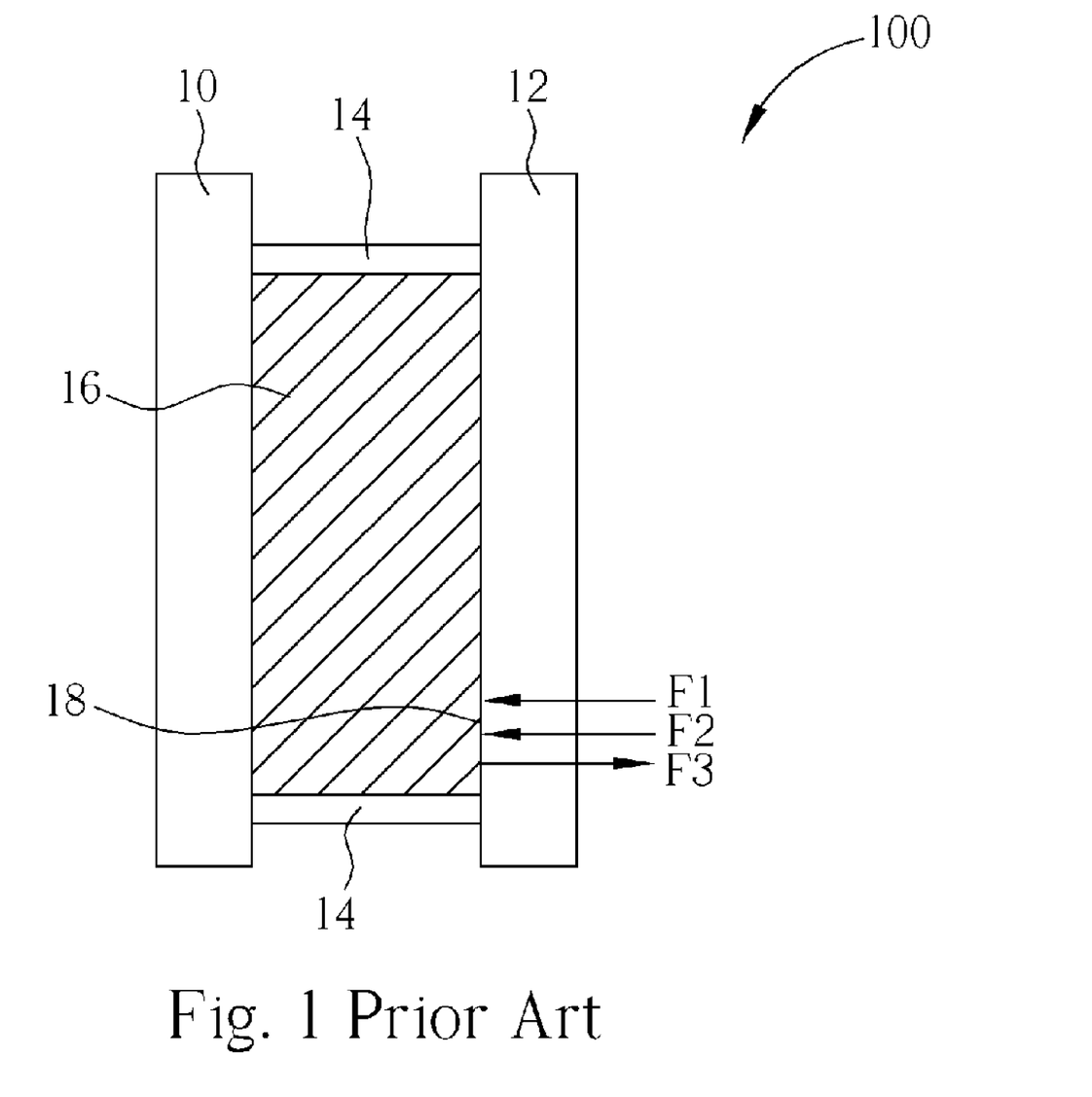
FIG. 1 is a schematic diagram of an erectly placed liquid crystal display panel according to the prior art.

Generally, the liquid crystal display panel is erectly placed, and gravity will change the internal pressure balance of the liquid crystal display panel. Please refer to FIG. 1, which is a schematic diagram of an erectly placed liquid crystal display panel according to the prior art. The liquid crystal display panel 100 has two glass substrates 10 and 12, and the liquid crystal 16 is filled between the glass substrates 10 and 12 and is encapsulated by a sealing area 14. When the liquid crystal display panel 100 is erectly placed, three kinds of forces, which are shown as F1, F2, and F3 in FIG. 1, are exerted onto the bottom region 18 of the liquid crystal display panel 100. The arrows indicate the directions of F1, F2, and F3. The first force F1 is caused by a pressure difference between the liquid crystal 16 in the liquid crystal display panel 100 and the outside environment. The second force F2 is caused by the capillarity of the liquid crystal 16. The third force F3 is caused by the gravity of the liquid crystal.

When the sum of the pulling forces F1 and F2 is larger than or equal to the pushing force of F3, the liquid crystal 16 in the liquid crystal display panel 100 is in a pressure balanced condition, and the images can be normally displayed. If the sum of the pulling forces F1 and F2 is smaller than the pushing force of F3, a gravity mura will happen at the bottom region 18 of the erectly placed liquid crystal display panel 100, and seriously worsen the image quality.

SUMMARY OF INVENTION

It is therefore a primary objective of the claimed invention to provide a repairing method for a liquid crystal display panel having a gravity defect, so that the unqualified products can be easily repaired.

According to the claimed invention, a repairing method for a liquid crystal display panel is disclosed. The repairing method includes steps of removing sealant outside of a liquid crystal injection hole and providing a first pressure to the liquid crystal display panel. Next, a second pressure is continuously provided to the liquid crystal display panel, and the sealant in the liquid crystal injection hole is removed. Then, a third pressure is continuously provided to the liquid crystal display panel for pressing the liquid crystal causing the liquid crystal to flowing out of the injection hole, and the pressed-out liquid crystal is cleaned. After that, the liquid crystal injection hole is sealed with a fresh sealant and a fourth pressure is continuously provided to the liquid crystal display panel. Finally, the fresh sealant is cured and the fourth pressure is removed.

According to the claimed invention, another repairing method for a liquid crystal display panel is disclosed. The repairing method includes steps of firstly defining a liquid crystal path in a sealing area. An auxiliary structure is formed at an edge of the liquid crystal display panel beside the liquid crystal path. A first pressure is continuously provided to the liquid crystal display panel. Next, a second pressure is continuously provided to the liquid crystal display panel, and the sealant in the liquid crystal path is removed. Then, a third pressure is continuously provided to the liquid crystal display panel for pressing the liquid crystal causing the liquid crystal to flow out, and the pressed-out liquid crystal is cleaned. After that, the liquid crystal path is sealed with a fresh sealant and a fourth pressure is continuously provided to the liquid crystal display panel. Finally, the fresh sealant is cured and the fourth pressure is removed.

These and other objectives of the claimed invention will no doubt become obvious to those of ordinary skill in the art after reading the following detailed description of the preferred embodiment that is illustrated in the various figures and drawings.

DETAILED DESCRIPTION

Figure 2:
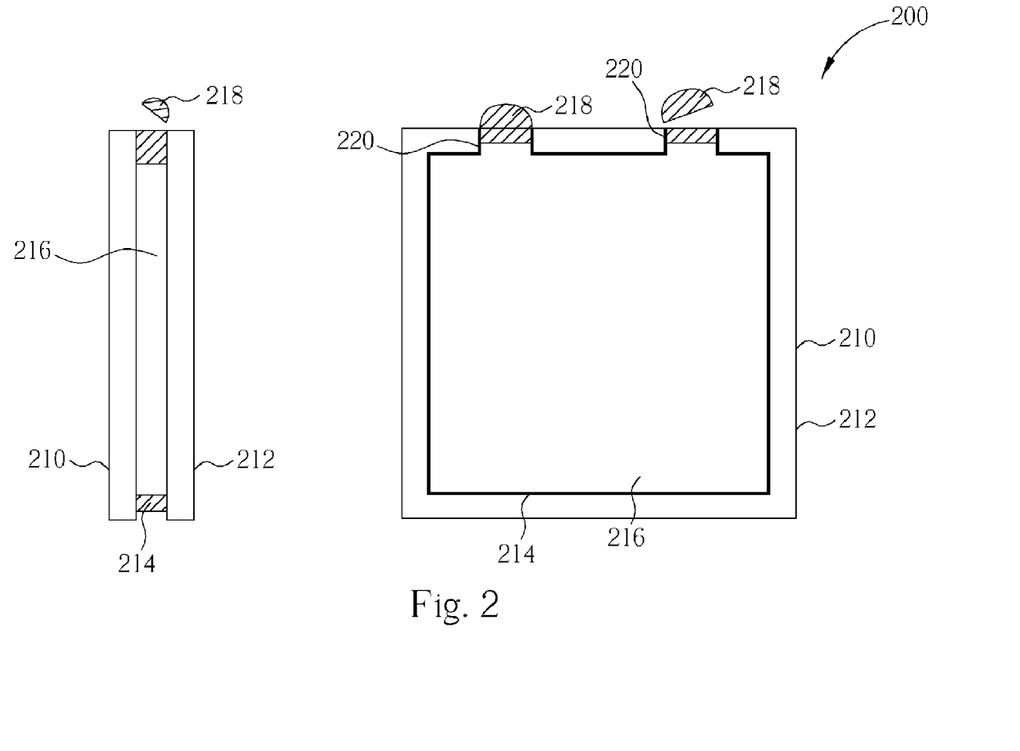
FIGS. 2 to 6 are schematic diagrams showing a repairing method according to the present invention.
Figure 3:
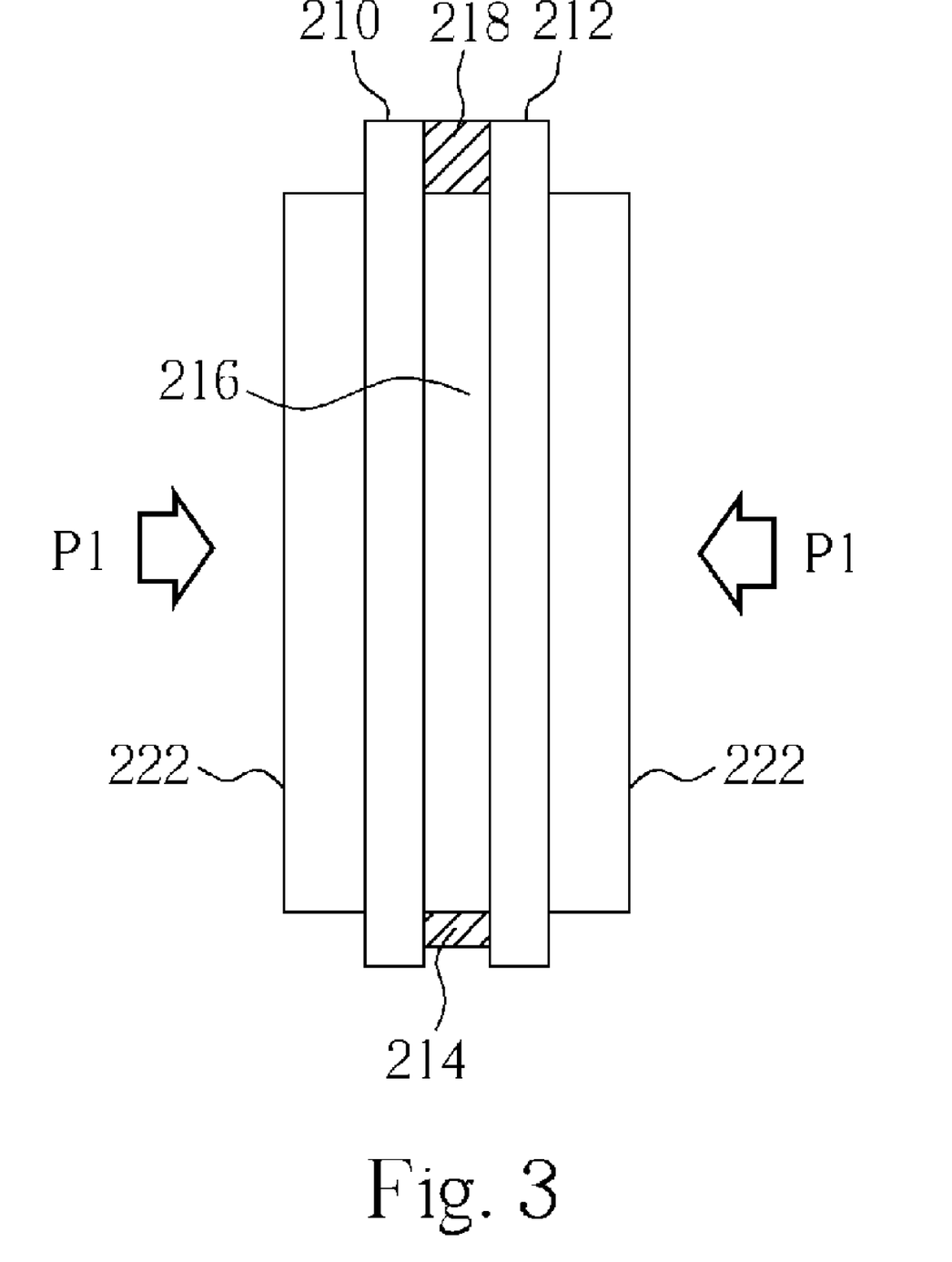

Please refer to FIGS. 2 to 6, which are schematic diagrams showing a repairing method according to the present invention. Firstly, as shown in FIG. 2, a sealing area 214 of the liquid crystal display panel 200 has at least one liquid crystal injection hole 220, and the sealant 218 is stuffed into the liquid crystal injection hole 220 for encapsulating the liquid crystal 216 between two glass substrates 210 and 212. The present method first removes the sealant 218 outside the liquid crystal injection hole 220, and continuously provides a first pressure P1 to two opposite surfaces of the liquid crystal display panel 200 as shown in FIGS. 2 and 3. When providing the first pressure P1, two clamping apparatus 222 are placed at two sides of the liquid crystal display panel 200 for pressing. The clamping apparatus 222 can be plates or air springs (air bags). When providing the first pressure P1, temperature of the liquid crystal display panel 200 is maintained at 20 to 80° to keep the liquid crystal 216 in large-capacity status.

Figure 4:
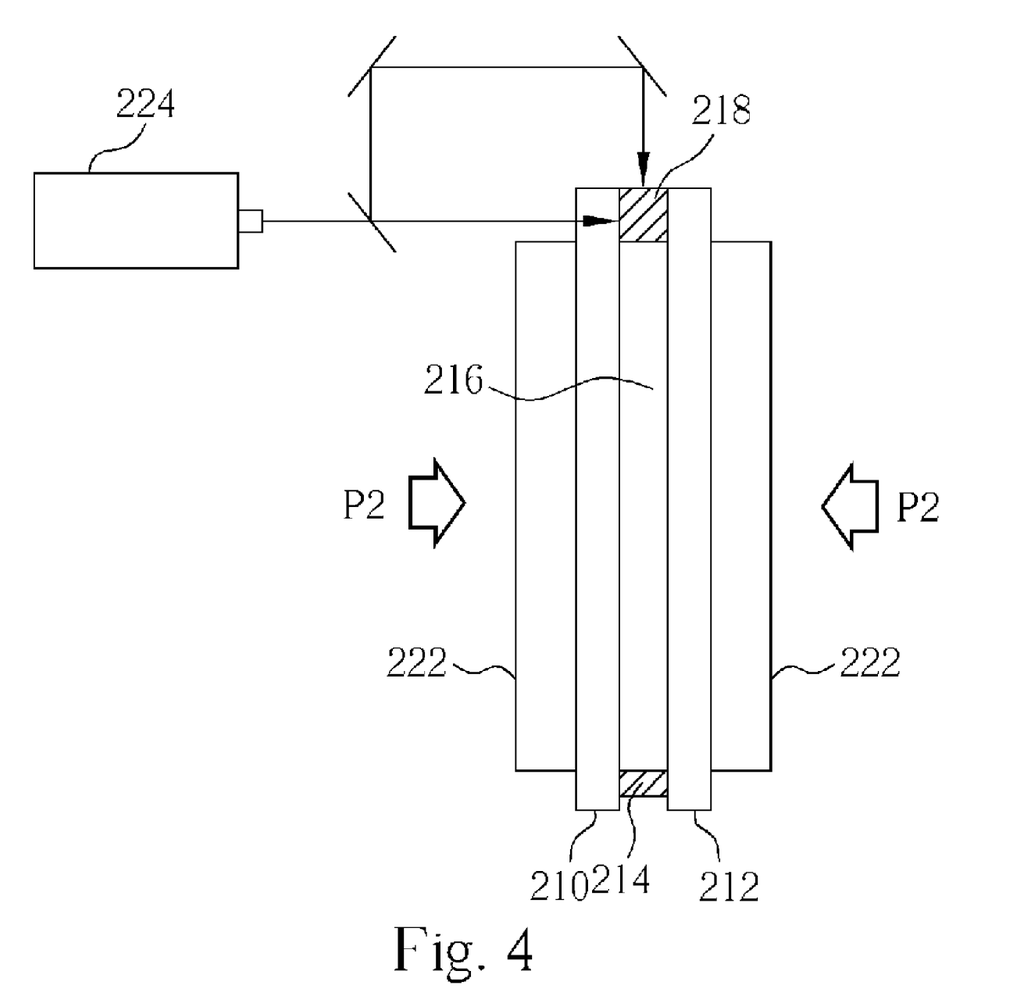
Figure 5:
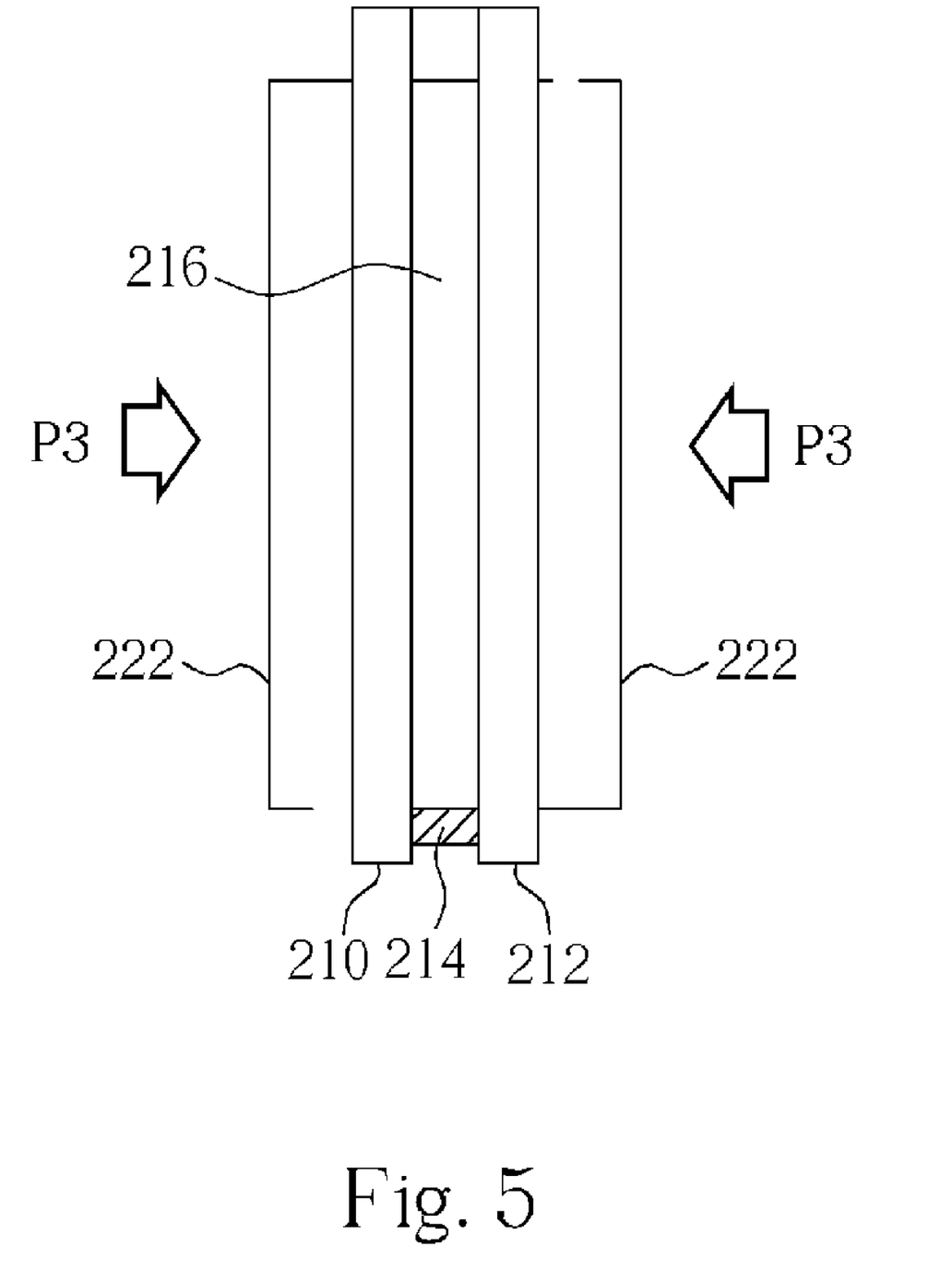

Please refer to FIG. 4, a second pressure P2 is continuously provided to two opposite surfaces of the liquid crystal display panel 200 via the clamping apparatus 222 and a laser 224 is used to remove the sealant 218 inside the liquid crystal injection hole 220. The second pressure P2 can be a little larger than or same as the first pressure P1. The laser 224 can melt or destroy the sealant 218 and the second pressure P2 can prevent air from getting into the gap between two glass substrates 210 and 212. Again, temperature of the liquid crystal display panel 200 is maintained at 20 to 80° to keep the liquid crystal 216 in the large-capacity status. After removing the sealant 218 inside the liquid crystal injection hole 220 as shown in FIG. 5, a third pressure P3 is continuously provided to two opposite surfaces of the liquid crystal display panel 200 via the clamping apparatus 222 causing a little liquid crystal 216 to be pressed out through the liquid crystal injection hole 220. Similarly, temperature of the liquid crystal display panel 200 is again maintained at 20 to 80° to keep the liquid crystal 216 in the large-capacity status. The third pressure P3 is larger than or same as the second pressure P2.

Figure 6:
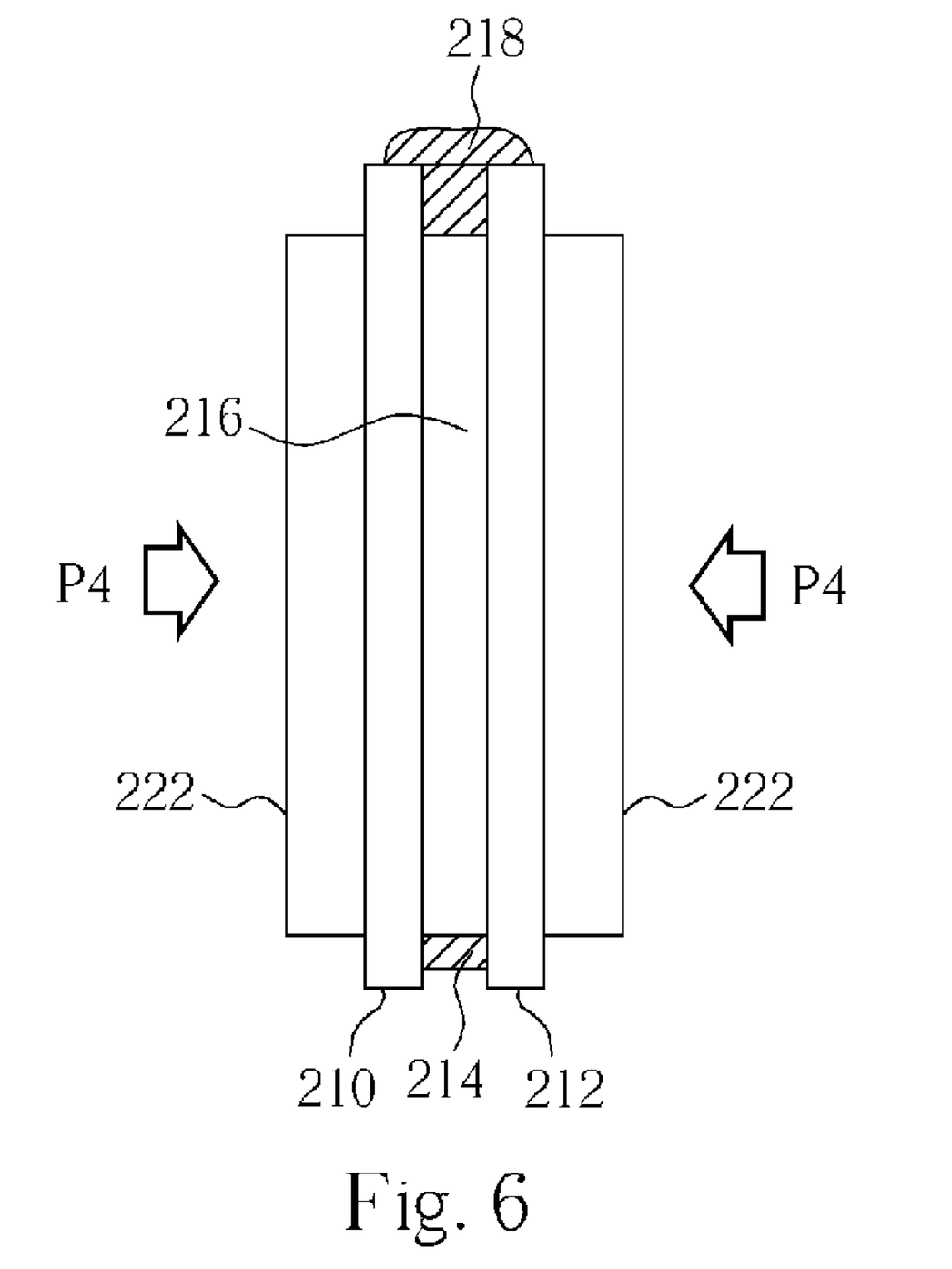

Please refer to FIG. 6, after cleaning the pressed-out liquid crystal 216, a fresh sealant 218 is used to re-seal the liquid crystal injection hole 220. A fourth pressure P4 is continuously provided to two opposite surfaces of the liquid crystal display panel 200 via the clamping apparatus 222 and a curing process is performed to harden the sealant 218. The fourth pressure P4 is larger than the second pressure P2 and is smaller than the third pressure P3. After these procedures, weight of the liquid crystal 216 in the liquid crystal display panel 200 will be reduced, and the gravity mura will be also repaired. The first, second, third, and fourth pressures are defined in accordance with the sequence when performing the repairing method, and not indicative of the relative strengths. The relationship of these four pressures is concluded as: the second pressure P2 is a little larger than or same as the first pressure P1, the third pressure P3 is larger than or same as the first pressure P2, and the fourth pressure P4 is larger than the second pressure P2 and is smaller than the third pressure P3.

Figure 7:
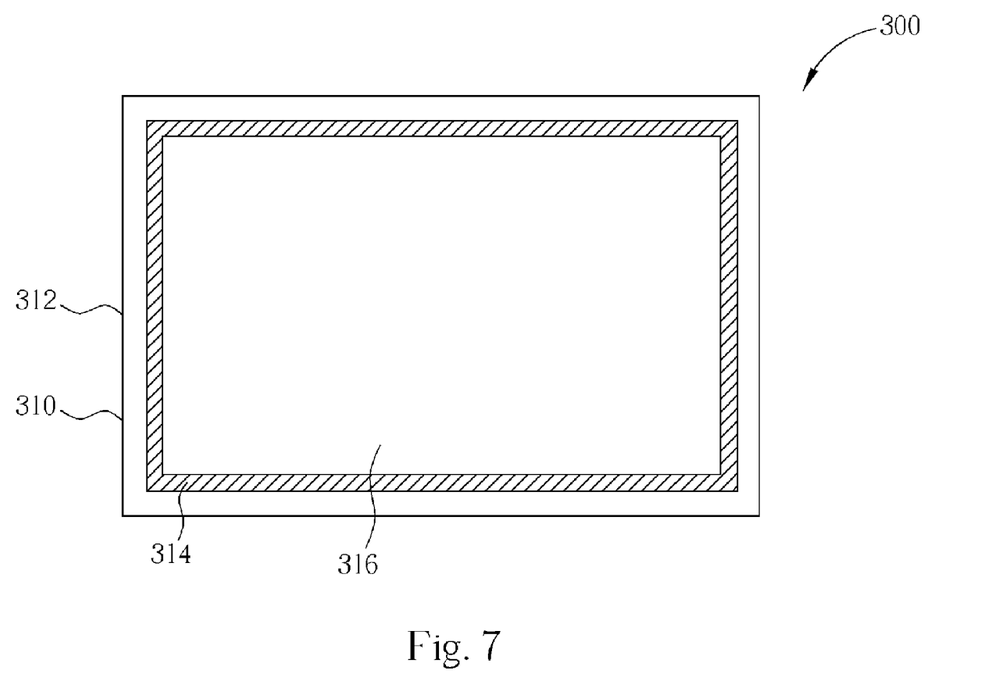
FIGS. 7 and 8 are schematic diagrams showing another repairing method according to the present invention.

Besides the liquid crystal display panel 200, there is another kind of panel manufactured by an on-drop-fill (ODF) method. Please refer to FIG. 7, which is a schematic diagram of the liquid crystal display panel 300 manufactured by the ODF method. The liquid crystal display panel 300 has two glass substrates 310 and 312. Liquid crystal 316 is filled in the region between the glass substrates 310 and 312 and is encapsulated with a sealing area 314. Since the manufacturing method is different, the liquid crystal display panel 300 has no liquid crystal injection hole. When repairing the liquid crystal display panel 300, an additional procedure is required.

Figure 8:
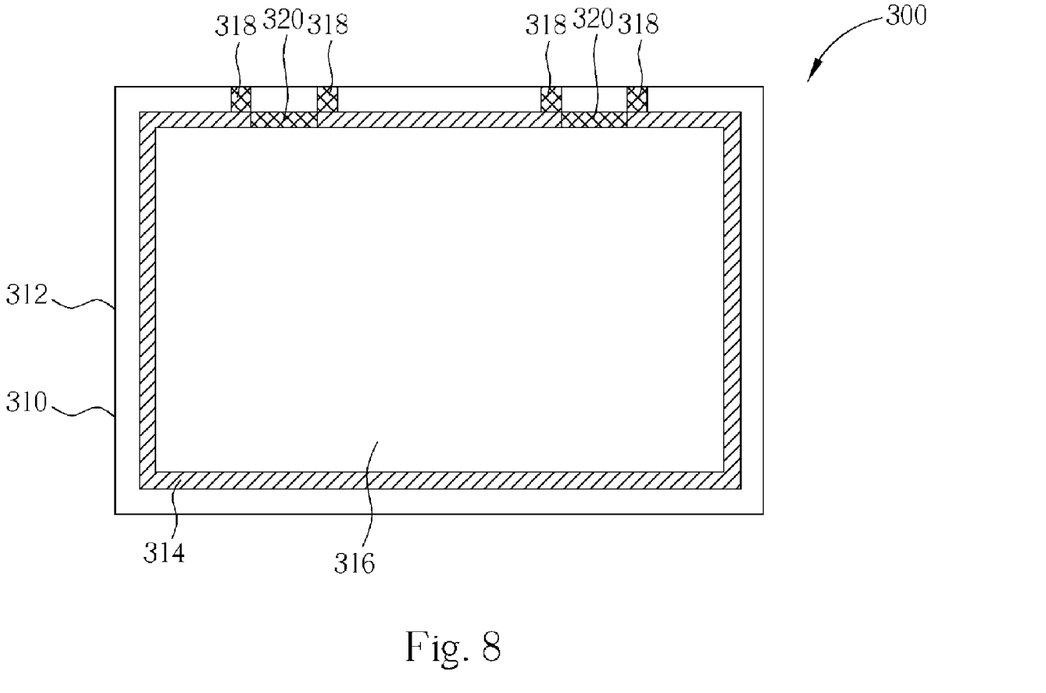

First, as shown in FIG. 8, at least a region of the sealing area 314 is selected and defined as a liquid crystal path 320, and an auxiliary structure 318 is formed at edge of the liquid crystal display panel 300 beside the liquid crystal path 320. The auxiliary structure 318 can limit the liquid crystal 316 to flowing in the liquid crystal path 320 when performing the repairing method. For forming the auxiliary structure 318, an ultraviolet sensitive material is filled into a gap between the two glass substrates 310 and 312 at two sides of the liquid crystal path 320. An ultraviolet light is utilized to harden the ultraviolet sensitive material. After finishing the liquid crystal path 320 and the auxiliary structure 318 beside it, a structure similar to the above-mentioned liquid crystal injection hole is formed, and the following procedures of the second embodiment is similar to that of the first embodiment.

A first pressure P1 is continuously provided to two opposite surfaces of the liquid crystal display panel 300. When providing the first pressure P1, two clamping apparatus are placed at two sides of the liquid crystal display panel 300 for pressing, and the clamping apparatus can be the plates or air springs (air bags). When providing the first pressure P1, temperature of the liquid crystal display panel 300 is also maintained at 20 to 80° to keep the liquid crystal 316 in large-capacity status. Then, a second pressure P2 is continuously provided to two opposite surfaces of the liquid crystal display panel 300 via the clamping apparatus, and a laser is used to remove the sealant inside the liquid crystal path 320. The second pressure P2 can be a little larger than or same as the first pressure P1. The laser can melt or destroy the sealant, and the second pressure P2 can prevent air getting into the gap between two glass substrates 310 and 312. Similarly, temperature of the liquid crystal display panel 300 is maintained at 20 to 80° to keep the liquid crystal panel 300 in the large-capacity status. After removing the sealant inside the liquid crystal path 320, a third pressure P3 is continuously provided to two opposite surfaces of the liquid crystal display panel 300 via the clamping apparatus, pressing a little liquid crystal 316 out of the liquid crystal path 320. Similarly, temperature of the liquid crystal display panel 300 is maintained at 20 to 80° to keep the liquid crystal 316 in the large-capacity status. The third pressure P3 is larger than or same as the second pressure P2.

After cleaning the excess pressed-out liquid crystal 316, a fresh sealant is used to seal the liquid crystal path 320 again. A fourth pressure P4 is continuously provided to two opposite surfaces of the liquid crystal display panel 300 via the clamping apparatus, and a curing process is performed to harden the sealant. The fourth pressure P4 is larger than the second pressure P2 and is smaller than the third pressure P3. After these procedures, weight of the liquid crystal 316 in the liquid crystal display panel 300 will be reduced, and the gravity mura will be also repaired. The first, second, third, and fourth pressures are defined in accordance with the sequence when performing the repairing method, and not indicative of the relative strengths. The relationship of these four pressures is concluded as: the second pressure P2 is a little larger than or the same as the first pressure P1, the third pressure P3 is larger than or the same as the first pressure P2, and the fourth pressure P4 is larger than the second pressure P2 and is smaller than the third pressure P3.

In contrast to the prior art, the present invention can reduce weight of the liquid crystal in the liquid crystal display panel, so that the gravity mura can be effectively repaired.

Those skilled in the art will readily observe that numerous modifications and alterations of the device may be made while retaining the teachings of the present invention. Accordingly, the above disclosure should be construed as limited only by the metes and bounds of the appended claims.

What is claimed is:

1. A repairing method for a liquid crystal display panel comprising:
   removing a sealant outside a liquid crystal injection area before providing a first pressure;
   continuously providing the first pressure to two opposite surfaces of the liquid crystal display panel;
   continuously providing a second pressure to two opposite surfaces of the liquid crystal display panel, and removing the sealant in the liquid crystal injection area;
   continuously providing a third pressure to two opposite surfaces of the liquid crystal display panel to press liquid crystal out through the liquid crystal injection area, and cleaning the pressed-out liquid crystal;
   sealing the liquid crystal injection area with a fresh sealant and continuously providing a fourth pressure to two opposite surfaces of the liquid crystal display panel; and
   curing the fresh sealant and removing the fourth pressure.

2. The repairing method of claim 1, wherein the liquid crystal injection area is a liquid crystal injection hole.

3. The repairing method of claim 1 wherein the liquid crystal injection area is a portion of a sealing area of the liquid crystal display panel, and an auxiliary structure is formed at an edge of the liquid crystal display panel beside the portion of the sealing area.

4. The repairing method of claim 3 wherein the auxiliary structure is formed by filling a gap of the liquid crystal display panel with an ultraviolet sensitive material and curing the ultraviolet sensitive material.

5. The repairing method of claim 3 wherein the liquid crystal display panel is filled up with the liquid crystal utilizing a one-drop-fill method.

6. The repairing method of claim 1 used for repairing an uneven defect on the liquid crystal display panel caused by a gravity issue.

7. The repairing method of claim 1 wherein the step of removing the sealant in the liquid crystal injection area utilizes a laser to burn down the sealant.

8. The repairing method of claim 1 wherein temperature of the liquid crystal display panel is maintained at 20 to 80° C. when providing the first pressure.

9. The repairing method of claim 1 wherein temperature of the liquid crystal display panel is maintained at 20 to 80° C. when providing the second pressure.

10. The repairing method of claim 1 wherein temperature of the liquid crystal display panel is maintained at 20 to 80° C. when providing the third pressure.

11. The repairing method of claim 1 wherein the first pressure equals the second pressure.

12. The repairing method of claim 1 wherein the second pressure equals the third pressure.

13. The repairing method of claim 1 wherein the third pressure is larger than the fourth pressure, the fourth pressure is larger than the first pressure, and the first pressure is similar to the second pressure.

* * * * *